United States Patent
Angell et al.

(10) Patent No.: US 8,626,505 B2
(45) Date of Patent: *Jan. 7, 2014

(54) IDENTIFYING AND GENERATING AUDIO COHORTS BASED ON AUDIO DATA INPUT

(75) Inventors: Robert L. Angell, Salt Lake City, UT (US); Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/605,248

(22) Filed: Sep. 6, 2012

(65) Prior Publication Data

US 2012/0330654 A1 Dec. 27, 2012

Related U.S. Application Data

(63) Continuation of application No. 12/275,830, filed on Nov. 21, 2008, now Pat. No. 8,301,443.

(51) Int. Cl.
*G10L 15/00* (2013.01)
(52) U.S. Cl.
USPC ........... 704/231; 704/246; 704/249; 704/250; 704/278
(58) Field of Classification Search
USPC ............. 704/231, 245, 257, 278, 272, 9, 246, 704/249, 250
See application file for complete search history.

(56) References Cited

U.S. PATENT DOCUMENTS

| | | | |
|---|---|---|---|
| 4,742,388 A | 5/1988 | Cooper et al. | |
| 5,664,109 A | 9/1997 | Johnson et al. | |
| 5,774,569 A | 6/1998 | Waldenmaier | |
| 6,054,928 A | 4/2000 | Lemelson et al. | |
| 6,119,096 A | 9/2000 | Mann et al. | |
| 6,178,141 B1 | 1/2001 | Duckworth et al. | |
| 6,242,186 B1 | 6/2001 | Salonen | |

(Continued)

FOREIGN PATENT DOCUMENTS

KR 20080082924 A 9/2008

OTHER PUBLICATIONS

Lymberopoulos et al., "An Easy-to-Program Sensor System for Parsing Out Human Activities," Embedded Networks and Application Lab, Enalab, Yale University, New Haven, CT, 2008, pp. 1-17.

(Continued)

*Primary Examiner* — Qi Han
(74) *Attorney, Agent, or Firm* — John R. Pivnichny; Law Office of Jim Boice

(57) ABSTRACT

A computer implemented method, system, and/or computer program product generates an audio cohort. Audio data from a set of audio sensors is received by an audio analysis engine. The audio data, which is associated with a plurality of objects, comprises a set of audio patterns. The audio data is processed to identify audio attributes associated with the plurality of objects to form digital audio data. This digital audio data comprises metadata that describes the audio attributes of the set of objects. A set of audio cohorts is generated using the audio attributes associated with the digital audio data and cohort criteria, where each audio cohort in the set of audio cohorts is a cohort of accompanied customers in a store, and where processing the audio data identifies a type of zoological creature that is accompanying each of the accompanied customers.

20 Claims, 4 Drawing Sheets

(56) References Cited

U.S. PATENT DOCUMENTS

| | | |
|---|---|---|
| 6,553,336 B1 | 4/2003 | Johnson et al. |
| 6,646,676 B1 | 11/2003 | DaGraca et al. |
| 6,795,808 B1 | 9/2004 | Strubbe et al. |
| 7,308,385 B2 | 12/2007 | Wegerich et al. |
| 7,363,309 B1 | 4/2008 | Waite et al. |
| 7,538,658 B2 | 5/2009 | Twitchell |
| 7,548,874 B2 | 6/2009 | Kanevsky et al. |
| 7,584,280 B2 | 9/2009 | Kim et al. |
| 7,634,109 B2 | 12/2009 | Steinberg et al. |
| 7,667,596 B2 | 2/2010 | Ozdemir et al. |
| 7,683,929 B2 | 3/2010 | Elazar et al. |
| 7,755,480 B2 | 7/2010 | Aritsuka et al. |
| 7,840,515 B2 | 11/2010 | Ozdemir et al. |
| 7,840,897 B2 | 11/2010 | Ancier |
| 7,846,020 B2 | 12/2010 | Walker et al. |
| 7,921,036 B1 | 4/2011 | Sharma et al. |
| 7,930,204 B1 | 4/2011 | Sharma et al. |
| 7,953,686 B2 | 5/2011 | Angell et al. |
| 7,974,869 B1 | 7/2011 | Sharma et al. |
| 8,000,777 B2 | 8/2011 | Jaeb et al. |
| 8,041,516 B2 | 10/2011 | Angell et al. |
| 8,117,144 B2 | 2/2012 | Angell et al. |
| 2002/0176604 A1 | 11/2002 | Shekhar et al. |
| 2002/0183971 A1 | 12/2002 | Wegerich et al. |
| 2002/0194117 A1 | 12/2002 | Nabe et al. |
| 2003/0023612 A1 | 1/2003 | Carlbom et al. |
| 2003/0036903 A1* | 2/2003 | Konopka et al. ............ 704/249 |
| 2003/0088463 A1 | 5/2003 | Kanevsky et al. |
| 2003/0131362 A1 | 7/2003 | Jasinschi et al. |
| 2003/0169907 A1 | 9/2003 | Edwards et al. |
| 2003/0174773 A1 | 9/2003 | Comaniciu et al. |
| 2003/0231769 A1 | 12/2003 | Bolle et al. |
| 2004/0064341 A1 | 4/2004 | Langan et al. |
| 2004/0095617 A1 | 5/2004 | Mangerson |
| 2004/0161133 A1 | 8/2004 | Elazar et al. |
| 2004/0174597 A1 | 9/2004 | Craig et al. |
| 2004/0181376 A1 | 9/2004 | Fables et al. |
| 2004/0225202 A1 | 11/2004 | Skinner |
| 2004/0240542 A1 | 12/2004 | Yeredor et al. |
| 2004/0249650 A1 | 12/2004 | Freedman et al. |
| 2005/0018861 A1 | 1/2005 | Tashev |
| 2005/0043060 A1 | 2/2005 | Brandenberg et al. |
| 2005/0125325 A1 | 6/2005 | Chai et al. |
| 2005/0169367 A1 | 8/2005 | Venetianer et al. |
| 2005/0187437 A1 | 8/2005 | Matsugu et al. |
| 2005/0216273 A1 | 9/2005 | Reding et al. |
| 2006/0000420 A1 | 1/2006 | Martin Davies |
| 2006/0004582 A1 | 1/2006 | Claudatos et al. |
| 2006/0111961 A1 | 5/2006 | McQuivey |
| 2006/0206379 A1* | 9/2006 | Rosenberg ............ 705/14 |
| 2006/0251339 A1 | 11/2006 | Gokturk et al. |
| 2007/0013776 A1 | 1/2007 | Venetianer et al. |
| 2007/0122003 A1 | 5/2007 | Dobkin et al. |
| 2007/0225577 A1 | 9/2007 | Mathan |
| 2007/0230270 A1 | 10/2007 | Calhoun |
| 2008/0004793 A1 | 1/2008 | Horvitz et al. |
| 2008/0004951 A1 | 1/2008 | Huang et al. |
| 2008/0024299 A1 | 1/2008 | Robertson |
| 2008/0031491 A1 | 2/2008 | Ma et al. |
| 2008/0055049 A1 | 3/2008 | Weill et al. |
| 2008/0067244 A1 | 3/2008 | Marks |
| 2008/0071162 A1 | 3/2008 | Jaeb et al. |
| 2008/0082399 A1 | 4/2008 | Noble et al. |
| 2008/0092245 A1 | 4/2008 | Alward et al. |
| 2008/0098456 A1 | 4/2008 | Alward et al. |
| 2008/0109398 A1 | 5/2008 | Harter |
| 2008/0228577 A1 | 9/2008 | Decre et al. |
| 2008/0240496 A1 | 10/2008 | Senior |
| 2008/0243439 A1 | 10/2008 | Runkle et al. |
| 2008/0260212 A1 | 10/2008 | Moskal et al. |
| 2008/0262743 A1 | 10/2008 | Lewis et al. |
| 2008/0306895 A1 | 12/2008 | Karty |
| 2009/0002155 A1 | 1/2009 | Ma et al. |
| 2009/0070138 A1 | 3/2009 | Langheier et al. |
| 2009/0092283 A1 | 4/2009 | Whillock et al. |
| 2009/0109795 A1 | 4/2009 | Marti |
| 2009/0164302 A1 | 6/2009 | Jung et al. |
| 2009/0171783 A1 | 7/2009 | Raju |
| 2009/0185723 A1 | 7/2009 | Kurtz et al. |
| 2009/0195401 A1 | 8/2009 | Maroney et al. |
| 2009/0231436 A1 | 9/2009 | Faltesek et al. |
| 2010/0008515 A1 | 1/2010 | Fulton et al. |
| 2010/0131206 A1 | 5/2010 | Angell et al. |
| 2010/0131263 A1 | 5/2010 | Angell et al. |
| 2010/0131502 A1 | 5/2010 | Fordham |
| 2010/0148970 A1 | 6/2010 | Angell et al. |
| 2010/0150457 A1 | 6/2010 | Angell et al. |
| 2010/0150458 A1 | 6/2010 | Angell et al. |
| 2010/0153146 A1 | 6/2010 | Angell et al. |
| 2010/0153147 A1 | 6/2010 | Angell et al. |
| 2010/0153174 A1 | 6/2010 | Angell et al. |
| 2010/0153180 A1 | 6/2010 | Angell et al. |
| 2010/0153353 A1 | 6/2010 | Angell et al. |
| 2010/0153389 A1 | 6/2010 | Angell et al. |
| 2010/0153390 A1 | 6/2010 | Angell et al. |
| 2010/0153458 A1 | 6/2010 | Angell et al. |
| 2010/0153470 A1 | 6/2010 | Angell et al. |
| 2010/0153597 A1 | 6/2010 | Angell et al. |
| 2010/0177169 A1 | 7/2010 | Saric |
| 2010/0207874 A1 | 8/2010 | Yuxin et al. |

OTHER PUBLICATIONS

Girgensohn et al., "Determining Activity Patterns in Retail Spaces Through Video Analysis," MM'08, Oct. 26-31, 2008.
Yalch et al., "The Effects of Music in a Retail Setting on Real and Perceived Shopping Times," Journal of Business Research 49, pp. 139-147, 2000.
Knowledge@Wharton, Tag Team, "Tracking the Pattern of Supermarket Shoppers," Published Jun. 1, 2005.
Gulas et al., "Right Under Our Noses: Ambient Scent and Consumer Responses," Journal of Business and Psychology, Fall 1995.
M. Bitner, "The Impact of Physical Surroundings on Customer and Employees," Journal of Marketing, Apr. 1992.
Brown et al., "IBM Smart Surveillance System (S3): An Open and Extendible Architecture for Smart Video Surveillance", Retrieved on Jan. 12, 2009, pp. 1-4.
M. Borg et al., "Video Surveillance for Aircraft Activity Monitoring", IEEE Conference on Advanced Video and Signal Based Surveillance, 2005, pp. 16-21.
Y. Matsushita et al., "Illumination Normalization With Time-Dependent Intrinsic Images for Video Surveillance", IEEE Transactions on Pattern Analysis and Machine Intelligence, vol. 26, Issue 10, Oct. 2004, pp. 1336-1347.
J. Davis et al., "An Adaptive Focus-of-Attention Model for Video Surveillance and Monitoring", Machine Vision and Application 18, 2007, pp. 41-64.
C. Larson et al., "The Shape of Threat: Simple Geometric Forms Evoke Rapid and Sustained Capture of Attention", Emotion 2007, vol. 7, No. 3, pp. 526-534.
A. Oredsson, "Cognitive Video Surveillance: An ANN/CBR Hybrid Approach", Master of Science in Informatics, Norwegian University of Science and Technology, Submitted Jun. 2007, pp. 1-136.
N. Siebel et al., "The Advisor Visual Surveillance System", Applications of Computer Vision '04, Prague, May 16, 2004, pp. 103-111.
Graham Center One-Pager, Types of Medical Errors Commonly Reported by Family Physicians, Am Fam Physician, Feb. 2003.
U.S. Appl. No. 12/333,256, filed Dec. 11, 2008.
U.S. Appl. No. 12/333,256—Non-Final Office Action Mailed May 23, 2011.
U.S. Appl. No. 12/275,830, filed Nov. 21, 2008.
U.S. Appl. No. 12/275,830—Non-Final Office Action Mailed Dec. 14, 2011.
U.S. Appl. No. 12/333,273, filed Dec. 11, 2008.
U.S. Appl. No. 12/333,273—Non-Final Office Action Mailed Sep. 30, 2011.
U.S. Appl. No. 12/333,316, filed Dec. 12, 2008.
U.S. Appl. No. 12/333,316—Non-Final Office Action Mailed Sep. 6, 2011.
U.S. Appl. No. 12/335,521, filed Dec. 15, 2008.

(56) References Cited

OTHER PUBLICATIONS

U.S. Appl. No. 12/335,521—Non-Final Office Action Mailed Jun. 27, 2011.
U.S. Appl. No. 12/335,521—Final Office Action Mailed Dec. 30, 2011.
U.S. Appl. No. 12/333,319, filed Dec. 12, 2008.
U.S. Appl. No. 12/333,319—Non-Final Office Action Mailed Jun. 21, 2011.
U.S. Appl. No. 12/333,319—Final Office Action Mailed Feb. 1, 2012.
U.S. Appl. No. 12/333,321, filed Dec. 12, 2008.
U.S. Appl. No. 12/333,321—Non-Final Office Action Mailed May 23, 2011.
U.S. Appl. No. 12/333,326, filed Dec. 12, 2008.
U.S. Appl. No. 12/335,731, filed Dec. 16, 2008.
U.S. Appl. No. 12/335,731—Non-Final Office Action Mailed Oct. 26, 2011.
U.S. Appl. No. 12/336,440, filed Dec. 16, 2008.
U.S. Appl. No. 12/336,440—Non-Final Office Action Mailed Jul. 21, 2011.
U.S. Appl. No. 12/336,440—Final Office Action Mailed Feb. 27, 2012.
U.S. Appl. No. 12/336,471, filed Dec. 16, 2008.
U.S. Appl. No. 12/336,471—Non-Final Office Action Mailed Nov. 17, 2011.
U.S. Appl. No. 12/336,488, filed Dec. 16, 2008.
U.S. Appl. No. 12/336,488—Non-Final Office Action Mailed Sep. 15, 2011.
U.S. Appl. No. 12/335,857, filed Dec. 16, 2008.
U.S. Appl. No. 12/335,857—Non-Final Office Action Mailed Feb. 3, 2011.
U.S. Appl. No. 12/335,857—Final Office Action Mailed Oct. 13, 2011.
U.S. Appl. No. 12/333,311, filed Dec. 12, 2008.
U.S. Appl. No. 12/333,311—Non-Final Office Action Mailed Feb. 28, 2011.
U.S. Appl. No. 12/333,311—Final Office Action Mailed Aug. 18, 2011.
U.S. Appl. No. 12/333,311—Non-Final Office Action Mailed Jan. 24, 2012.
U.S. Appl. No. 12/333,323, filed Dec. 12, 2008.
U.S. Appl. No. 12/333,323—Notice of Allowance Mailed Nov. 15, 2011.
U.S. Appl. No. 12/335,857—Examiner's Answer Mailed Mar. 5, 2012, pp. 1-17.
U.S. Appl. No. 12/336,488—Final Office Action Mailed Mar. 9, 2012, pp. 1-24.
U.S. Appl. No. 12/335,521—Examiner's Answer Mailed Apr. 25, 2012, pp. 1-9.
U.S. Appl. No. 12/333,326—Non-Final Office Action Mailed May 16, 2012, pp. 1-12.
U.S. Appl. No. 12/333,273—Final Office Action Mailed May 23, 2012, pp. 1-12.
U.S. Appl. No. 12/277,122, filed Nov. 24, 2008.
U.S. Appl. No. 12/277,122—Non-Final Office Action Mailed May 10, 2011.
U.S. Appl. No. 13/370,811, filed Feb. 10, 2012.
U.S. Appl. No. 13/402,586, filed Feb. 22, 2012.
U.S. Appl. No. 12/275,830—Notice of Allowance Mailed Jun. 25, 2012.
U.S. Appl. No. 12/333,311—Final Office Action Mailed Jun. 1, 2012.
U.S. Appl. No. 12/336,488—Examiner's Answer Mailed Oct. 25, 2012.
L. Herbert, "Othello Error: Facial Profiling, Privacy, and the Suppression of Dissent", Ohio State Journal of Criminal Law, vol. 5, 2007, pp. 79-129.
U.S. Appl. No. 12/336,440—Examiner's Answer Mailed Nov. 23, 2012.
U.S. Appl. No. 12/333,321—Non-Final Office Action Mailed Dec. 19, 2012.
B. Welsh et al., "Effects of Improved Street Lighting on Crime," Sep. 24, 2008, Campbell Systematic Reviews. The Campbell Collaboration, pp. 1-54.
U.S. Appl. No. 12/333,321—Final Office Action Mailed Jun. 3, 2013.
U.S. Appl. No. 12/333,256—Final Office Action Mailed Jun. 26, 2013.
U.S. Appl. No. 12/336,471—Notice of Allowance Mailed Mar. 21, 2013.
U.S. Appl. No. 12/333,273—Non-Final Office Action Mailed Jan. 31, 2013.
U.S. Appl. No. 12/333,256—Non-Final Office Aciton Mailed Feb. 14, 2013.
U.S. Appl. No. 12/333,273—Notice of Allowance Mailed Aug. 2, 2013.
U.S. Appl. No. 12/333,311 Non-Final Office Action Mailed Oct. 1, 2013.
U.S. Appl. No. 12/333,321—Examiner's Answer Mailed Sep. 25, 2013.

* cited by examiner

IDENTIFYING AND GENERATING AUDIO COHORTS BASED ON AUDIO DATA INPUT

The present application is a continuation of U.S. patent application Ser. No. 12/275,830, filed on Nov. 21, 2008, and titled, "Identifying and Generating Audio Cohorts Based on Audio Data Input," which is incorporated herein by reference.

BACKGROUND

The present invention relates generally to an improved data processing system and in particular to a method and apparatus for generating cohorts. More particularly, the present invention is directed to a computer implemented method, apparatus, and computer usable program code for processing audio input data to generate cohorts.

A cohort is a group of people, animals, plants, places, or objects that share a common attribute or experience. For example, a group of people born in 1980 may form a birth cohort. A cohort may include one or more sub-cohorts. For example, the birth cohort of people born in 1980 may include a sub-cohort of people born in 1980 in Salt Lake City, Utah. A sub-subcohort may include people born in 1980 in Salt Lake City, Utah to low income, single parent households.

Cohorts are frequently generated based on one or more attributes of the members of each cohort. The information used to identify the attributes of members of a cohort is typically provided by the members of the cohort. However, information describing attributes of members of a cohort may be voluminous, dynamically changing, unavailable, difficult to collect, and/or unknown to the member of the cohort and/or the user selecting members of a cohort. Moreover, it may be difficult, time consuming, or impractical for an individual to access all the information necessary to accurately generate cohorts. Thus, unique cohorts may be sub-optimal because individuals lack the skills, time, knowledge, and/or expertise needed to gather cohort attribute information from available sources.

SUMMARY

A computer implemented method, system, and/or computer program product generates an audio cohort. Audio data from a set of audio sensors is received by an audio analysis engine. The audio data, which is associated with a plurality of objects, comprises a set of audio patterns. The audio data is processed to identify audio attributes associated with the plurality of objects to form digital audio data. This digital audio data comprises metadata that describes the audio attributes of the set of objects. A set of audio cohorts is generated using the audio attributes associated with the digital audio data and cohort criteria, where each audio cohort in the set of audio cohorts is a cohort of accompanied customers in a store, and where processing the audio data identifies a type of zoological creature that is accompanying each of the accompanied customers.

DETAILED DESCRIPTION

Figure 1:
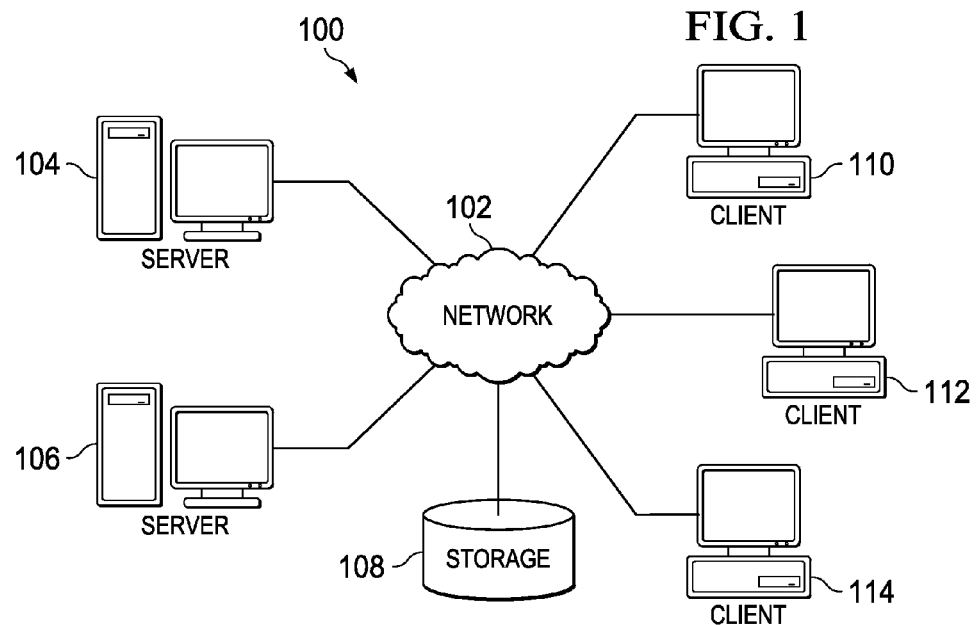
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
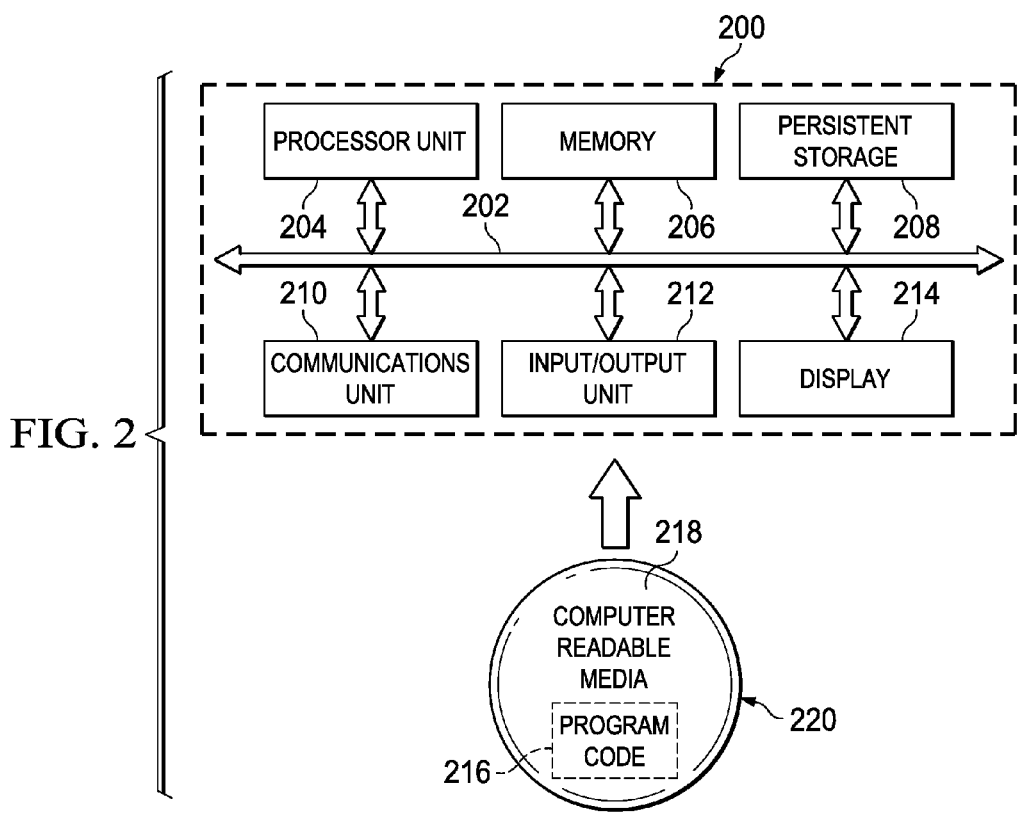
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse.

Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In many industries and professions, such as, without limitation, search and rescue, research, and industry, it is useful to be able to distinguish different sounds, determine the strength of a sound, and the source of a particular sound. A human user may manually identify sounds and the source of a sound using natural human sense of hearing and/or a human user utilizing a hearing aid or other device that amplifies or modulates sounds for the wearer in combination with the human user's knowledge and experience. However, this technique is limited by the human ability to hear and the human ability to distinguish different sounds in a multitude of different sounds.

Currently, electronic sensing technologies have been developed that are capable of reproducing human senses using audio sensors and other electronic devices, such as microphones. The illustrative embodiments recognize that the information generated by electronic audio sensors may be used to identify cohorts and improve selection of members of cohorts. As used herein, a cohort is a group of objects that share at least one common attribute. The objects in a cohort may be humans, animals, plants, places, locations, or inanimate objects. A cohort may be a null set having no members, a single member, or a group including two or more members. Cohorts may be used in research, marketing, safety studies, and many other industries for various uses.

Therefore, in one embodiment of the present invention, a computer implemented method, apparatus, and computer program product for generating audio cohorts is provided. An audio analysis engine receives audio data from a set of audio input devices. An audio input device is any type of device that can capture, detect, measure, or record vibrations and sound waves transmitted through solids, liquids, semi-solids, or gases, such as, without limitation, the air. For example, an audio input device may be implemented as, but without limitation, a microphone or a sonar device. The audio data may be in an analog format. The audio data is associated with one or more objects. The audio data may include a set of audio patterns. As used herein, the term "set" refers to one or more, unless specifically defined otherwise. Thus, a set of audio patterns comprises one or more audio patterns. An audio pattern may be any type of pattern, such as, without limitation, patterns in frequency, wavelength, speed, direction, volume, intensity, or any other attribute in audio data.

An audio analysis engine analyzes and processes the audio data and any audio patterns in the audio data to generate digital audio data. The digital audio data comprises metadata describing the audio attributes of the audio data. The audio analysis engine may utilize any type of known or available audio analysis software, audio spectrum analyzer, bioacoustic analysis software, and/or voice recognition software, also referred to as speech recognition software.

An audio attribute is a characteristic, feature, property, character, or quality of a human, an animal, a plant, an object, a place, or a location. For example, audio attributes may include an identification of a sound, identification of a type of sound, a source or origin of a sound, identification of an object generating a sound, identification of a combination of sounds, identification of a combination of objects generating a sound or a combination of sounds, a volume of a sound, and sound wave properties.

A sound wave property is a measurable property of a sound. Sound wave properties include, without limitation, the frequency, wavelength, amplitude, intensity, speed, and direction of a sound. The type of sound may be a general classification or sub-classification of a sound. A type of sound may include, without limitation, a human voice talking, an animal sound, an engine sound, a baby cry, a door opening or closing, footsteps, water running, rain, sound of breaking or shattering, laughter, or any other types of sounds. A sub-category of a type of sound may be more specific. For example, and without limitation, the classification of a human voice talking may have sub-classifications of a female voice talking, a male voice talking, a human voice talking in a whisper, a human voice talking loudly, a human voice talking with a southern accent, a human voice talking with a Texas accent, a human voice talking with a Scottish brogue, a human voice talking with a particular dialect or regional accent, talking in English, talking in Spanish, or talking in any other language.

An identification of a sound is an identification of a particular sound. For example, an identification of a sound may be the sound of a Harley motorcycle engine, a specific, identified, person's voice, a particular door opening or closing, or some other specific, identified sound. For example, a sound may be identified generally as a human voice, specifically as an identified person's voice, human speech, or specific content of the human speech. Still more particularly, the identification of a sound may include an identification of the sound as human speech and an identification of attributes of the human speech. Attributes of human speech may include, without limitation, an identification of at least one of a language spoken, a regional dialect associated with the human speech, an accent associated with the human speech, an identification of whether the speaker is male or female, a rapidity of speech, and an identification of words spoken in the human speech or the subject matter/content of the speech. The phrase "at least one" means that the attributes of human speech may include only a single one of the listed attributes, as well as any combination of two or more of the attributes of human speech. For example, the attributes may include an identification of the speaker as male. In another example, the attributes may identify the speaker as a male speaker that is speaking English. In yet another example, the attributes may identify the speaker as a female speaking Spanish with a Venezuelan dialect.

A set of audio cohorts is generated using the attributes in the digital audio data and cohort criteria. Cohort criteria are rules, standards, guidelines, or other criteria for selecting members of a cohort. For example, and without limitation, cohort criteria may specify that members of a car cohort should only include cars with engines that generate noises below a certain loudness threshold.

The set of audio cohorts may comprise a single cohort, as well as two or more cohorts. An audio cohort may have any number of members from a null set to an infinite number of members. An audio cohort may include members that are sounds or audio information. However, audio cohorts are not limited to sounds or audio information describing sounds. A member of an audio cohort may include a human, animal, plant, place, location, or inanimate object. In other words, an audio cohort is a cohort with member objects that are selected using audio data and attributes of audio data. In one embodiment, the audio cohort may be used in a system wide monitoring process to quickly and efficiently pass vital information to a real-time computational process. Thus, the embodiments permit a user to create cohorts based on audio data describing different sounds, sources of different sounds, and other attributes of one or more sounds in a particular area or environment.

For example, and without limitation, a user may wish to identify every customer in a shopping mall that is speaking to a sale representative or speaking to someone in customer service. In such a case, the user may analyze digital audio data to identify customers that are associated with conversations taking place at customer service centers and/or customers speaking to employees prior to making a purchase. These customers may then be selected as members of one or more cohorts of customers utilizing employee expertise or otherwise utilizing customer services provided by employees.

In another example, attributes of the audio data may be used to identify sounds made by animals and sounds made by babies or children. In such a case, the attributes in the audio data may be used to identify customers with a child or customers with a pet. This audio data may then be used to create cohorts of children, cohorts of pets, cohorts of dogs, cohorts of babies, cohorts of toddlers, cohorts of young children, cohorts of parents or guardians with children, and/or cohorts of pet owners with their pets. These cohorts provide an effective tool for users to create cohorts based on an analysis of audio sensory input gathered by audio input devices, such as, without limitation, a microphone.

Figure 3:
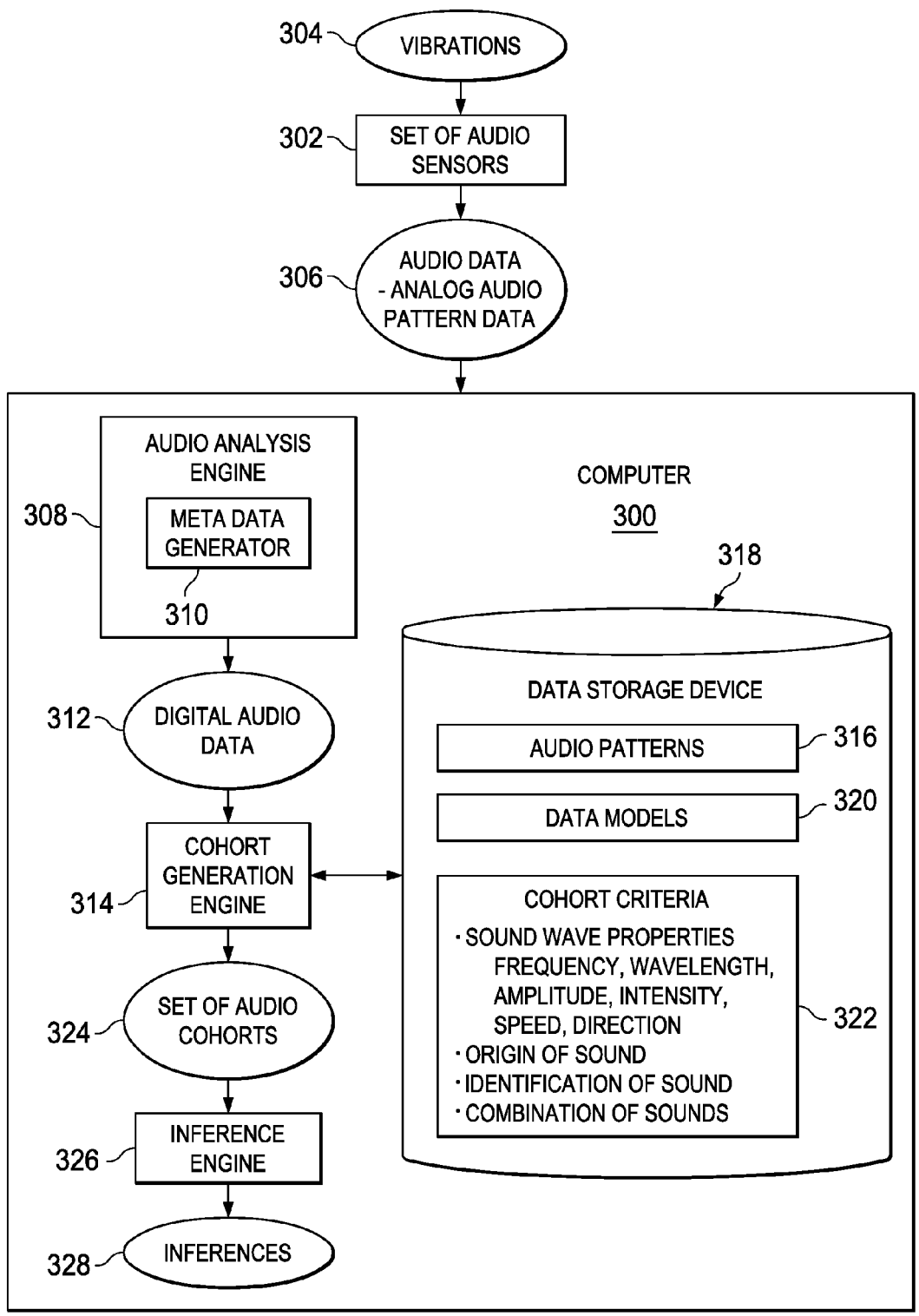
FIG. 3 is a block diagram of an audio sensory input analysis system in accordance with an illustrative embodiment.

FIG. 3 is a block diagram of an audio sensory input analysis system in accordance with an illustrative embodiment. Computer 300 may be implemented using any type of computing device, such as, but not limited to, a main frame, server, a personal computer, laptop, personal digital assistant (PDA), or any other computing device depicted in FIGS. 1 and 2.

Set of audio sensors 302 is a set of audio input devices that detect, capture, and/or record vibrations 304, such as, without limitation, pressure waves and sound waves. Vibrations 304 may be detected as vibrations 304 are transmitted through a solid object, a liquid, a semisolid, or a gas, such as the air or atmosphere. Set of audio sensors 302 may include only a single audio input device, as well as two or more audio input devices. An audio sensor in set of audio sensors 302 may be implemented as any type of device, such as, without limitation, a microphone, a sonar device, an acoustic identification system, or any other device capable of detecting vibrations 304 transmitted through a medium, such as a solid, liquid, semisolid, and/or gas.

In this embodiment, set of audio sensors 302 is implemented as a set of microphones connected to computer 300, which detects and records sounds and identifies patterns of sounds in vibrations 304. However, set of audio sensors 302 is not limited to implementation using only microphones.

Set of audio sensors 302 analyzes vibrations 304 in the audio sample to generate audio data 306. In this example, audio data 306 is analog data generated by set of audio sensors 302 in response to detecting vibrations 304. However, the embodiments are not limited to audio data in an analog format. The embodiments may also be implemented using a set of audio sensors that generate audio data in a digital format.

Audio data 306 may include audio patterns in vibrations 304 identified by set of audio sensors 302. An audio pattern is a pattern of data that describes patterns or changes the properties of sound waves that occur over time. Different audio patterns are created as a result of contact or exposure with different sounds, different volumes of sounds, different environments which may amplify, echo, or absorb sound, and/or different combinations of sounds in a particular environment.

For example, a particular audio pattern is produced when a dog barks and a different audio pattern is produced when an engine is revved up. Likewise, a dog barking outside in an open area with few obstructions will produce one audio pattern, while a dog barking in an enclosed space that tends to cause sound to bounce of one or more surfaces and echo sound back will produce a different audio pattern. In another example, if two dogs are barking at a cat that is meowing, a different audio pattern is produced than when only a single dog is barking in an empty room with no other sources of sound present. In other words, a unique audio pattern is produced in response to each unique type of sound, origin of sound, location or environment where the sound is detected, combination of different sounds, and/or volume of the sound.

Audio data 306 is generated in response to set of audio sensors 302 detecting a particular sound and/or combinations of sounds in a single audio sample or a series of audio samples. An audio sample comprises the vibrations that are detected and/or recorded during a particular time period. For example, and without limitation, a microphone may record sounds for ten minutes. In such a case, the ten minutes of recording may be a single audio sample or the ten minutes of recording may be broken up into thirty (30) second audio samples to create twenty (20) audio samples from the ten minutes of recording. However, an audio sample is not limited to ten minute or thirty second time periods. An audio recording may be broken down into any number of time segments, such as, without limitation, hours, minutes, seconds, milliseconds, microseconds, or any other units of time. An audio recording may also be broken down into a single audio sample, as well as two or more audio samples.

In addition, the embodiments do not require that an audio recording be separated into audio samples. An audio recording may be analyzed as a single recording in which a particular segment of the recording is identified or located using time indicators or any other indicators. For example, in an hour long audio recording, indicators may be used to identify a particular segment of the audio recording that occurs twenty minutes (20) and twenty (20) seconds into the recording, or the segment may be identified using the time. So if the segment occurring twenty minutes and twenty seconds into the recording were recorded from 3:45 p.m. to 3:46 p.m., that segment may be identified and located using the time. In another example, a particular segment may be identified using an identification number, an index, or any other method for identifying portions of an audio recording.

Set of audio sensors 302 sends audio data 306 to audio analysis engine 308 in computer 300. If audio data 302 is in an analog format, audio analysis engine 308 converts audio data 306 from the analog format into a digital format that is compatible with cohort generation engine 314. In other words, audio analysis engine 308 processes audio data 306 to form digital audio data 312. Digital audio data 312 identifies attributes of vibrations 304. Digital audio data 312 comprises metadata describing the identified attributes of vibrations 304 sounds in the audio sample used to generate digital audio data 312. Metadata generator 310 is a software component for generating the metadata describing the attributes of vibrations 304. The metadata in digital audio data 312 describes attributes of vibrations 304 detected in an audio sample. For example, and without limitation, attributes in digital audio data 312 may identify a source or origin of a sound, the type of sound, identify a particular sound, identify a combination of sounds, and/or any other attributes. Digital audio data 312 may be transmitted to cohort generation engine 314 as, without limitation, a digital wave file with the metadata.

Digital audio data 312 may also be used to identify humans and animals with irregular breathing, wheezing, congestion, coughing, or sneezing to identify, for example and without limitation, patients and/or animals that are suffering from infections, bronchitis, asthma, the flu, a cold or other health problems, the sound of car alarms, gas leaks, tornado sirens, smoke alarms, fire alarms, burglar alarms, police sirens, fire truck sirens, ambulance sirens, and other emergency or warning alarms that may indicate the presence of potentially hazardous conditions, emergency situations, and/or dangerous substances.

Cohort generation engine 314 receives digital audio data 312 from audio analysis engine 308. Cohort generation engine 314 may request digital audio data 312 from audio analysis engine 308. In another embodiment, audio analysis engine 308 automatically sends digital audio data 312 to cohort generation engine 314 in real time as digital audio data 312 is generated. In yet another embodiment, audio analysis engine 308 sends digital audio data 312 to cohort generation engine 314 upon the occurrence of a predetermined event, such as, without limitation, a predetermined time, completion of processing audio data 306, occurrence of a timeout event, a user request for generation of set of audio cohorts 324 based on digital audio data 312, or any other predetermined event.

Cohort generation engine 314 generates set of audio cohorts 324 based on digital audio data 312. In one embodiment, cohort generation engine 314 compares the audio patterns described in digital audio data 312 with identified audio patterns 316 for comparison. Each different sound and/or combination of sounds in a particular environment creates a different audio pattern. Audio patterns 316 are audio patterns for known sounds and/or combinations of sounds in a particular environment. A particular audio pattern may be compared to known audio patterns. If a match is found, the matching audio pattern may be used to identify attributes of a particular sound associated with vibrations 304.

Cohort generation engine 314 may optionally process digital audio data 312 in data models 320. Data models 320 are a set of one or more data models for processing audio data and identifying attributes of sounds associated with vibrations 304. A data model is a model for structuring, defining, organizing, imposing limitations or constraints, and/or otherwise manipulating data and metadata to produce a result. A data model may be generated using any type of modeling method or simulation including, but not limited to, a statistical method, a data mining method, a causal model, a mathematical model, a marketing model, a behavioral model, a psychological model, a sociological model, or a simulation model. In one embodiment, digital audio data 312 is processed using one or more data models to create one or more audio cohorts. For example, a data model may be used to identify customers in a department store that are not speaking English. This information is used to create a cohort of English speaking customers and/or cohorts of non-English speaking customers. Likewise, the audio data may be processed in a data model to identify customers speaking a particular language, such as Spanish, German, Mandarin, or any other language. This information may be used to create a cohort of Spanish speaking customers, a cohort of Mandarin speaking customers, and so forth. This information may be useful, for example and without limitation, where a store is providing customer service or employees that speak Spanish, Mandarin, or other languages to better serve their customers.

Cohort generation engine 314 generates set of audio cohorts using cohort criteria 322 and optionally, the results of processing digital audio data 312 in data models 320 and/or comparisons of digital audio data 312 with known audio patterns 316.

Cohort criteria 322 are a set of criteria and/or guidelines for generating set of audio cohorts 324. Cohort criteria 322 may include, without limitation, sound wave properties, origin of a sound, identification of a sound, and/or identification of a combination of sounds. The sound wave properties may include, without limitation, frequency, volume, amplitude, pitch, wavelength, intensity, direction, and/or speed. Other cohort criteria may include, without limitation, dialect, regional accents, and/or the content of human conversation. The content of human conversation refers to the actual words spoken by a human or the subject matter of a conversation. The audio of a human conversation may be converted into data describing the content of the conversation using any type of known or available speech recognition software. The cohort criteria specify the criteria used to select members for a cohort. For example, and without limitation, cohort criteria may specify that a particular cohort should include all cars with engine producing sounds above a certain volume or decibel level.

Cohort generation engine 314 may also optionally utilize cohort constraints (not shown) to generate set of audio cohorts 324. Cohort constraints specify attributes that are absent from members of a given cohort. In other words, cohort constraints specify attributes that are not present or that are not associated with the members of a particular cohort group. This is in contrast to cohort criteria which specify attributes that are required for members of a particular cohort.

Set of audio cohorts 324 is a set of one or more cohorts. Each cohort comprises a set having null to infinity member. In other words, an audio cohort may have no members, a single member, or two or more members that share a common attribute. A member of a cohort may be a human, an animal, a plant, place, thing, or object.

For example, if digital audio data 312 indicates the sounds of footsteps along a jogging path and one or more dogs barking in a park, the digital audio data 312 may be used to generate cohorts of pet owners walking their dogs in the park. Digital audio data 312 may be used to identify cohorts of patients in a hospital with symptoms of coughing, congestion, labored breathing, and/or abnormal breath sounds. Digital audio data 312 may be used to create a cohort of patients having irregular or labored breathing and/or cohorts of patients with regular, unlabored breathing. In yet another example, digital audio data 312 may be used to identify cars, motorcycles, trucks, and other motor vehicles with irregular engine firing indicating the vehicle may need a tune-up or new spark plugs or other mechanical problems that may be identified based on sounds made by the vehicle while being started, idling, driving, changing gears, or other operation of the vehicle. The information may be used to create cohorts of vehicle that need a tune-up, new spark plugs, a new starter, or other maintenance and repair work. Thus, the audio cohorts may be used for a variety of industrial, medical, health, safety, and research related endeavors. The audio cohorts may be used as a set of methodologies to solve a variety of problems.

In one embodiment, cohort generation engine 314 provides set of audio cohorts 324 to inference engine 326. Inference engine 326 is a computer program that derives inferences from a knowledge base. In this example, inference engine 326 derives inferences 328 from set of audio cohorts 324 and/or any other data available in the knowledge base. The data in the knowledge base may include data located in a database located locally on computer 300 as well as data located on one or more remote data storage devices that may be accessed using a network connection, such as data storage device 318. Data storage device 318 is any type of device for storing data, such as, without limitation, storage 108 in FIG. 1.

Inferences are conclusions regarding possible future events or future changes in the attributes of cohorts that are drawn or inferred based on the knowledge base and set of audio cohorts 324. For example, and without limitation, set of audio cohorts 324 may be analyzed by inference engine 326 to determine whether a particular volcano is about to erupt, an approximate time when the volcano may erupt, and/or a duration of the potential eruption. In another example, inference engine 326 may generate inferences regarding which customers are likely to purchase particular products based on cohorts of customers using those products.

In this embodiment, set of chemical sensors 302 is implemented as a separate device than computer 300. However, in another embodiment, set of chemical sensors 302 and audio pattern analysis 308 in computer 300 may be embodied within a single device.

Figure 4:
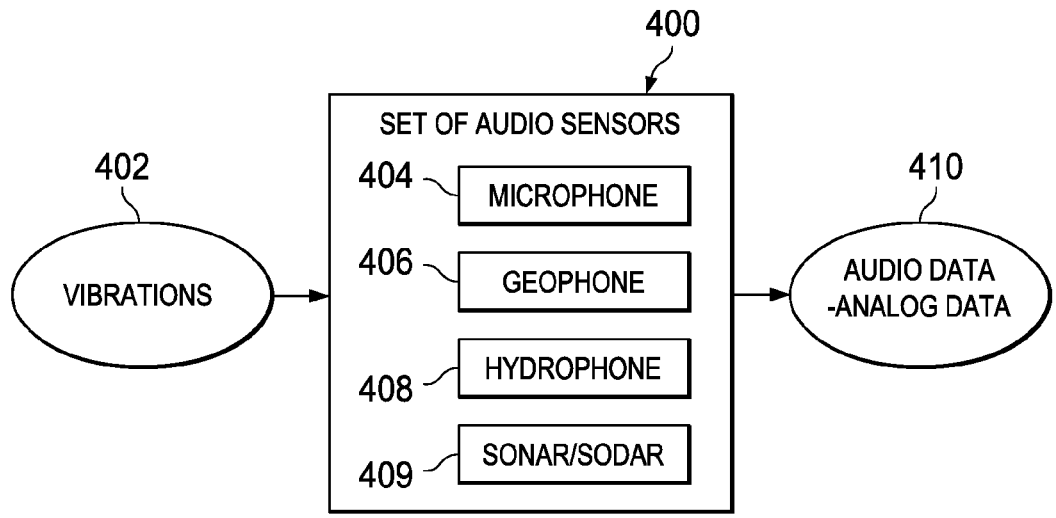
FIG. 4 is a block diagram of a set of audio sensors for capturing audio sensory input is shown in accordance with an illustrative embodiment.

Turning now to FIG. 4, a block diagram of an audio sensor for capturing audio sensory input is shown in accordance with an illustrative embodiment. Set of audio sensors 400 is a set of device for detecting and/or recording vibrations 402 moving through a medium, such as a solid, liquid, semi-solid, or gas. Set of audio sensors 400 may include microphone 404. Microphone 404 is a device that converts sound to an electric signal. Microphone 404 may be implemented using one or more microphones. Microphone 404 may be a wired microphone or a wireless microphone. Microphone 404 device that detects vibrations 402 moving through a medium, such as a solid, liquid, semi-solid, or gas. Geophone 406 is a device that detects vibrations 402 moving through the ground or soil. Hydrophone 408 is a device that detects vibrations 402 moving through water or other liquids.

Sonar/Sodar 409 is a sound navigation and ranging (SONAR) and/or sound detection and ranging (SODAR) device that detects the presence of people, animals, plants, and objects using variations in sound speed and echo ranging. Sonar/Sodar 409 may be a passive device that passively receives vibrations 402. Sonar/Sodar 409 may also be implemented using an active sonar/sodar device that transmits a pulse and then uses a receiver to receive reflections of the pulse bouncing off objects. Set of audio sensors 400 generates audio data 410 in an analog format in response to detecting vibrations 402.

Set of audio sensors 400 is not limited to including one or more microphones, geophones, hydrophones, sonars, and/or sodars. Set of audio sensors 400 may include any combination of microphones, geophones, hydrophones, sonars, and/or sodars. Set of audio sensors 400 may include only microphones. In another example, set of audio sensors 400 may include both microphones and sonar devices. Likewise, set of audio sensors 400 may include other devices for detecting vibrations 402 that are not shown in FIG. 4. For example, set of audio sensors 400 may include only an acoustic location device that detects vibrations 402 and determines a distance and direction of an object based on vibrations 402. Thus, set of audio sensors 400 may include any combination of audio sensors capable of detecting vibrations 402 and generating audio data 410 in response to vibrations 402.

Figure 5:
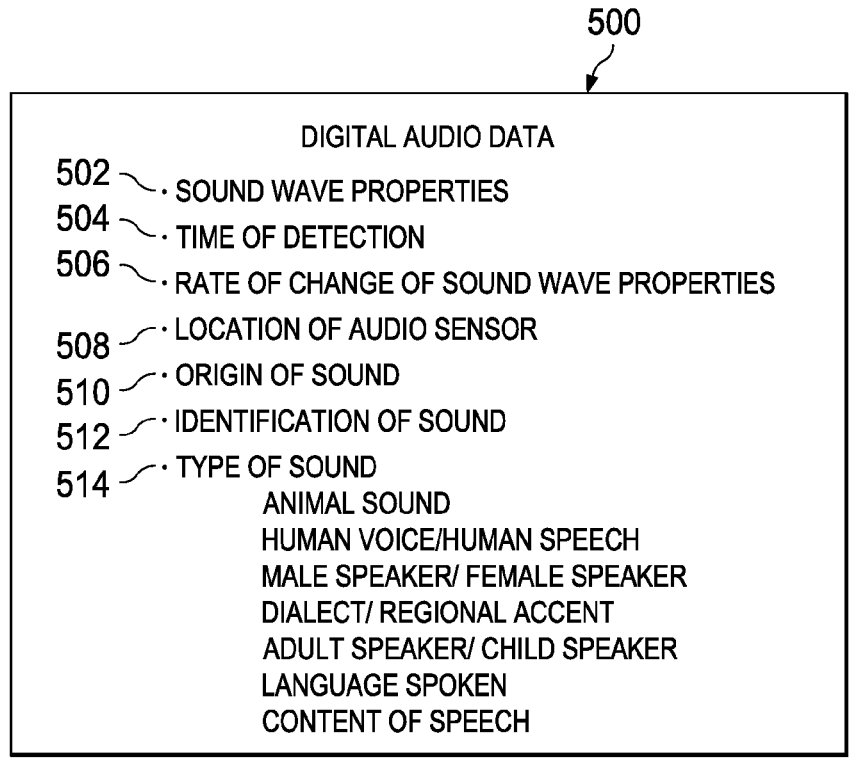
FIG. 5 is a block diagram of digital audio data generated based on results of processing audio data in accordance with an illustrative embodiment.

FIG. 5 is a block diagram of digital audio data generated based on results of processing audio data in accordance with an illustrative embodiment. Digital audio data 500 is digital data comprises metadata describing the attributes of audio data, such as, but without limitation, sound wave properties 502, a time of detection 504 of the sound waves, rate of change of sound wave properties 506, location of the audio sensor 508, origin of the sound waves 510 or origin of the person, animal, plant, or object generating the sound waves, identification of the sound 512 and/or identification of the type of sound 514. The type of sound may include, without limitation, animal sounds, engine sounds, bicycle sounds, human voice or human speech sounds, whether human speech sounds are being generated by a males speaker or a female speaker, the language being spoken, the content of the human speech, and/or whether human speech or words are being spoken with a dialect or regional accent, such as, without limitation, a Scottish brogue or a Southern accent.

The embodiments are not limited to the audio attributes shown in digital audio data 500. For example, audio attributes may also include the volume of a sound, the distortion, interference, timbre, brightness of a sound, and any other properties of sound.

Figure 6:
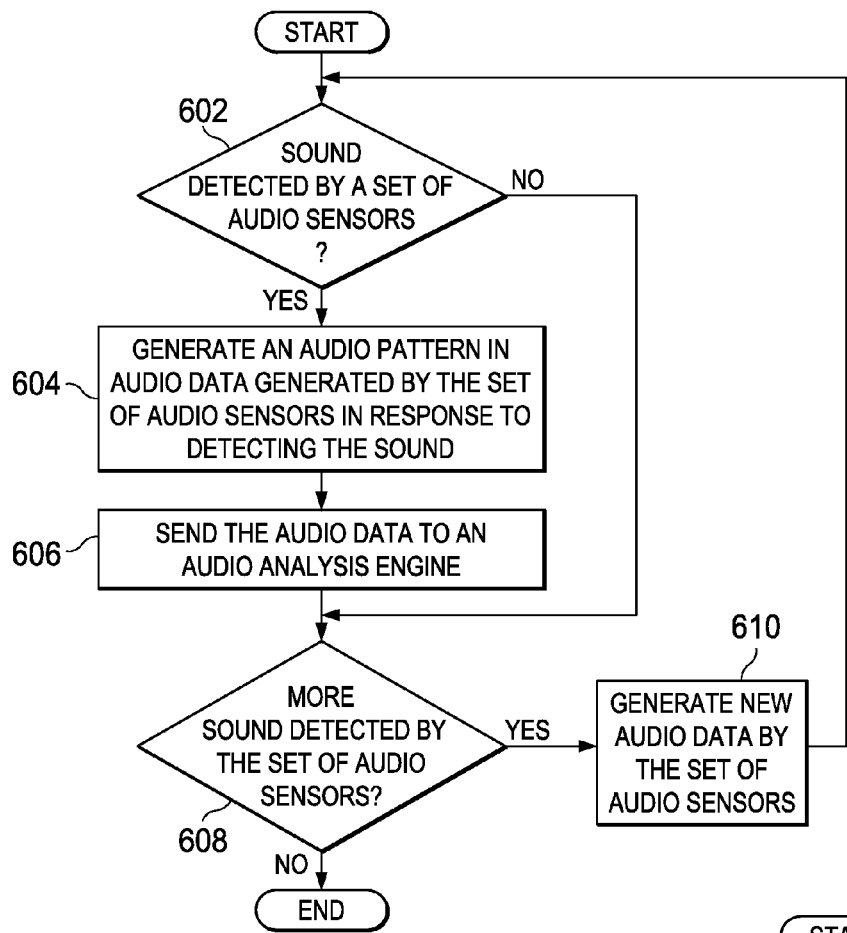
FIG. 6 is a flowchart of a process for generating audio data in accordance with an illustrative embodiment.

Referring now to FIG. 6, a flowchart of a process for generating audio data in accordance with an illustrative embodiment. The process in FIG. 6 may be implemented by a set of one or more audio sensors, such as set of audio sensors 302 in FIG. 3.

The process begins by making a determination as to whether any sound is detected by a set of audio sensors (step 602). If sound is detected, the set of audio sensors generates an audio pattern in the audio data in response to detecting the sound (step 604). The set of audio sensors sends the audio data with the audio patterns to an audio analysis engine (step 606).

Returning to step 602, if no sound is detected or after sending the audio data to the audio analysis engine in step 606, a determination is made as to whether more sound is detected by the set of audio sensors (step 608). If more sounds are not detected, the process terminates.

Returning to step 608, if a determination is made that more sounds are detected, the set of audio sensors generate new audio data (step 610) based on the new sounds detected by the set of audio sensors. The set of audio sensors then returns to step 602 and implements steps 602-610 iteratively until no new air samples are taken at step 608 and the process terminates thereafter.

Figure 7:
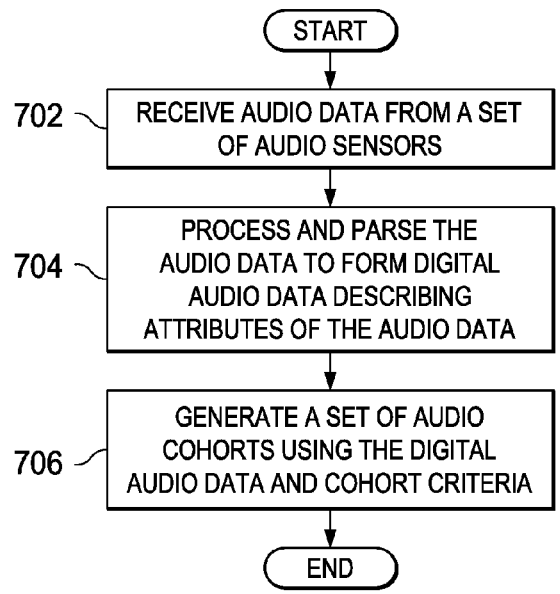
FIG. 7 is a flowchart of a process for generating cohorts based on audio sensory input in accordance with an illustrative embodiment.

Turning now to FIG. 7, a flowchart of a process for generating cohorts based on audio sensory input is shown in accordance with an illustrative embodiment. The process in FIG. 7 may be implemented by software for processing audio data, such as audio analysis engine 308 in FIG. 3. Step 706 may be implemented by software for generating cohorts groups based on digital audio data, such as cohort generation engine 314 in FIG. 3.

The process begins by receiving audio data from a set of audio sensors (step 702). The audio analysis engine processes and parses the audio data to form digital audio data describing attributes of the audio data (step 704). The cohort generation engine generates a set of audio cohorts using the digital audio data and cohort criteria, such as cohort criteria 322 in FIG. 3 (step 706) with the process terminating thereafter. As discussed above, the cohort generation engine is not limited to using only the digital audio data and cohort criteria. The cohort generation engine may also optionally utilize cohort constraints, data models, identified audio patterns, and any other available analysis tools and information to select members of a particular cohort group based on available audio data and audio attributes.

Thus, in one embodiment, a computer implemented method, apparatus, and computer program product for generating audio cohorts is provided. An audio analysis engine receives audio data from a set of audio input devices. The audio data is in an analog format. The audio data identifies a set of audio patterns. The audio data is processed and attributes of the audio data are identified to form digital audio data. The digital audio data comprises metadata describing the attributes of the audio data. A set of audio cohorts is generated using the digital audio data.

The cohort generation engine may be used to identify cohorts based on types of sounds, identification of sounds, contents of speech, languages spoken, combinations of sounds, the strength and direction of a sound, the volume of a sound, and other properties of sounds. The audio analysis engine may be used, without limitation, to identify illnesses based on sounds such as coughing, sneezing, wheezing breath, rattling in the chest, and other sounds. The audio analysis engine may also be used to identify particular people based on the sound of someone's voice, their accent or dialect, and other speech attributes. Audio attributes may also be used to identify cars, motorcycles, and machines based on the sounds of engines and machine parts, identify animals based on barking, meowing, and other animal articulations, and identify objects based on sounds made by the objects when the objects move or are acted upon by an outside force. The audio cohorts may be used in a variety of industries for a variety of purposes such as, for example and without limitation, in sales, marketing, marketing research, medical and diagnostic research, public health, demographic research, marketing trends, safety and/or security. The olfactory cohorts may also be used for quality control in the food industry, in pharmaceuticals, manufacturing, diagnostics, and other areas.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of generating audio cohorts, the computer implemented method comprising:
   receiving audio data from a set of audio sensors, by an audio analysis engine, wherein the audio data is associated with a plurality of objects, and wherein the audio data comprises a set of audio patterns;
   processing the audio data to identify audio attributes associated with the plurality of objects to form digital audio data, wherein the digital audio data comprises metadata describing the audio attributes of the set of objects; and
   generating a set of audio cohorts using the audio attributes associated with the digital audio data and cohort criteria, wherein each audio cohort in the set of audio cohorts is a cohort of accompanied customers in a store, wherein said processing the audio data includes identifying a type of zoological pet creature that is represented by at least part of the audio attributes associated with the objects and is accompanying each of the accompanied customers.

2. The computer implemented method of claim 1, wherein the zoological pet creature is dog.

3. The computer implemented method of claim 1, further comprising:
   augmenting the set of audio cohorts with a cohort of pet owners walking their dogs in a park, wherein the cohort of pet owners is generated from sounds of footsteps along a jogging path and one or more dogs barking in the park.

4. The computer implemented method of claim 1, further comprising:
   receiving the set of audio cohorts by an inference engine; and
   processing the set of audio cohorts by the inference engine, wherein the inference engine uses the set of audio cohorts to generate a set of inferences, and wherein the set of inferences predicts a future activity by the accompanied customers.

5. The computer implemented method of claim 1, wherein the audio attributes of the audio data comprise an identification of a sound.

6. The computer implemented method of claim 1, wherein the audio attributes of the audio data comprise an identification of a sound that is identified as human speech, and wherein the audio attributes of the audio data identify one or more of sound identifications from a group consisting of a language spoken, a regional dialect associated with the human speech, an accent associated with the human speech, an identification of whether the speaker is male or female, an identification of words spoken in the human speech, and an identification of a vocalized breathing sound.

7. The computer implemented method of claim 1, wherein the audio attributes of the audio data comprise sound wave properties, wherein a sound wave property is at least one of frequency, wavelength, amplitude, intensity, speed, and direction of a sound associated with an object in the plurality of objects.

8. The computer implemented method of claim 1, wherein the audio attributes of the audio data comprise an origin of a sound, and wherein the audio attributes of the audio data identify whether the origin of the sound is indoors or outdoors based on a presence or absence of an echo.

9. The computer implemented method of claim 1, wherein the audio data is a first set of audio data generated at a first time interval, and further comprising:
   receiving a second set of audio data taken at a second time interval; and
   processing the first audio data and the second audio data to generate the digital audio data, wherein the digital audio data describes the audio attributes of the first audio data and the second audio data.

10. The computer implemented method of claim 1, wherein identifying the set of audio cohorts using the digital audio data further comprises:

analyzing the digital audio data by a cohort generation engine to identify the set of audio cohorts, wherein the cohort generation engine processes and identifies attributes of sounds associated with vibrations, and wherein the cohort generation engine identifies customers speaking a particular language.

11. A computer program product for generating audio cohorts, the computer program product comprising:

a non-transitory computer readable storage medium;

first program instructions to receive audio data from a set of audio sensors, by an audio analysis engine, wherein the audio data is associated with a plurality of objects, and wherein the audio data comprises a set of audio patterns;

second program instructions to process the audio data to identify audio attributes associated with the plurality of objects to form digital audio data, wherein the digital audio data comprises metadata describing the audio attributes of the set of objects; and third program instructions to generate a set of audio cohorts using the audio attributes associated with the digital audio data and cohort criteria, wherein each audio cohort in the set of audio cohorts is a cohort of accompanied customers in a store, wherein said processing the audio data includes identifying a type of zoological pet creature that is represented by at least part of the audio attributes associated with the objects and is accompanying each of the accompanied customers; and wherein the first, second, and third program instructions are stored on the non-transitory computer readable storage medium.

12. The computer program product of claim 11, wherein the zoological pet creature is a dog.

13. The computer program product of claim 11, further comprising:

fourth program instructions to augment the set of audio cohorts with a cohort of pet owners walking their dogs in a park, wherein the cohort of pet owners is generated from sounds of footsteps along a jogging path and one or more dogs barking in the park, wherein the fourth program instructions are stored on the non-transitory computer readable storage medium.

14. The computer program product of claim 11, wherein the audio attributes of the audio data comprise an identification of a sound that is identified as human speech, and wherein the audio attributes of the audio data identify one or more of sound identifications from a group consisting of a language spoken, a regional dialect associated with the human speech, an accent associated with the human speech, an identification of whether the speaker is male or female, an identification of words spoken in the human speech, and an identification of a vocalized breathing sound.

15. The computer program product of claim 11, wherein the audio attributes of the audio data comprise an origin of a sound, and wherein the audio attributes of the audio data identify whether the origin of the sound is indoors or outdoors based on a presence or absence of an echo.

16. A computer system comprising:

a processor, a computer readable memory, and a computer readable storage medium;

first program instructions to receive audio data from a set of audio sensors, by an audio analysis engine, wherein the audio data is associated with a plurality of objects, and wherein the audio data comprises a set of audio patterns;

second program instructions to process the audio data to identify audio attributes associated with the plurality of objects to form digital audio data, wherein the digital audio data comprises metadata describing the audio attributes of the set of objects; and third program instructions to generate a set of audio cohorts using the audio attributes associated with the digital audio data and cohort criteria, wherein each audio cohort in the set of audio cohorts is a cohort of accompanied customers in a store, wherein said processing the audio data includes identifying a type of zoological creature that is represented by at least part of the audio attributes associated with the objects and is accompanying each of the accompanied customers; and wherein the first, second, and third program instructions are stored on the computer readable storage medium for execution by the processor via the computer readable memory.

17. The computer program product of claim 16, wherein the zoological creature is a minor human.

18. The computer program product of claim 16, wherein the zoological creature is a pet animal.

19. The computer program product of claim 16, wherein the audio attributes of the audio data comprise an identification of a sound that is identified as human speech, and wherein the audio attributes of the audio data identify one or more of sound identifications from a group consisting of a language spoken, a regional dialect associated with the human speech, an accent associated with the human speech, an identification of whether the speaker is male or female, an identification of words spoken in the human speech, and an identification of a vocalized breathing sound.

20. The computer program product of claim 16, wherein the audio attributes of the audio data comprise an origin of a sound, and wherein the audio attributes of the audio data identify whether the origin of the sound is indoors or outdoors based on a presence or absence of an echo.

* * * * *